United States Patent [19]

Nara

[11] Patent Number: 4,506,996

[45] Date of Patent: Mar. 26, 1985

[54] CRYOGENIC THERMOMETER

[75] Inventor: Koichi Nara, Ibaraki, Japan

[73] Assignees: Agency of Industrial Science & Technology; Ministry of International Trade & Industry, both of Tokyo, Japan

[21] Appl. No.: 477,857

[22] Filed: Mar. 22, 1983

[30] Foreign Application Priority Data

Aug. 27, 1982 [JP] Japan .................. 57-148588

[51] Int. Cl.³ .................. G01K 7/00; G01K 1/02
[52] U.S. Cl. .................. 374/176; 338/32 S; 346/33 TP; 374/186
[58] Field of Search .................. 374/176, 178, 186; 324/71.6, 203; 336/DIG. 1; 335/216; 323/360; 357/5; 338/32 S

[56] References Cited

U.S. PATENT DOCUMENTS

| Re. 25,712 | 1/1965 | Slade | 336/DIG. 1 |
| 3,428,891 | 2/1969 | Purcell et al. | 324/71.6 X |
| 3,868,768 | 3/1975 | Meyer | 174/126 S X |
| 4,044,298 | 8/1977 | Ekin | 323/360 |
| 4,384,265 | 5/1983 | Shimamoto et al. | 174/126 S X |

FOREIGN PATENT DOCUMENTS 0830149 5/1981 U.S.S.R. .................. 374/176

OTHER PUBLICATIONS

Publication: Published Application, Great Britain No. 2,107,064, 4/20/83, derived from 1977 application 7902357, pp. A1, A2, 1, 2 and 6.
"Superconductors in Instrumentation", D. H. Parkinson, J. Sci. Instrum., 1964, vol. 41, pp. 68–77.

Primary Examiner—Daniel M. Yasich
Attorney, Agent, or Firm—Oblon, Fisher, Spivak, McClelland & Maier

[57] ABSTRACT

A thermometer capable of providing temperature measurement over a wide temperature range comprises at least one temperature detection unit consisting of a first superconductor as a core, and a normal conductor and a second superconductor sequentially superposed coaxially on the first superconductor; a first power source disposed to pass electric current between the first and second superconductors, a second power source disposed between the opposite terminals of the first superconductor, and a voltmeter connected to the first and second superconductors. This thermometer effects measurement of temperature by fixing the value of the electric current from the first power source and changing the value of the electric current from the second power source thereby causing cyclic change of the voltage and measuring the increment of electric current from the second power which is required to cause one cycle of change of the voltage.

8 Claims, 6 Drawing Figures

CRYOGENIC THERMOMETER

BACKGROUND OF THE INVENTION:

This invention relates to a thermometer which is capable of measuring cryogenic temperatures with high accuracy and is serviceable over a wide temperature range.

Secondary thermometers used for measuring cryogenic temperatures come in two types, i.e. resistance thermometers and magnetic thermometers. The resistance thermometers are designed to effect measurement of temperatures by virtue of the variation in resistance which a metal such as, for example, platinum, nickel or copper, manifests in response to the change in temperature. They operate with comparatively satisfactory repeatability so far as the measurement is limited to a temperature range above 20 mK, but cannot be adapted to the measurement in a wide temperature range below 100 mK at which accurate temperature measurement is required today in the fields of industrial science and technology. Magnetic thermometers effect measurement of temperatures by making use of the fact that magnetic susceptibility is inversely proportional to temperature. They are useful for the measurement of temperatures in a range below 1° K. When transported however, their device constants are inevitably affected. Thus, they entail a serious disadvantage that they are not capable of providing reliable means of international comparison and standardization.

A normal conductor in the proximity of a superconductor causes repulsion of magnetic field, a phenomenon called the Meissner effect. The volume of the repulsion of magnetic field due to this phenomenon varies as a function of temperature. Attempts have been made to use the Meissner effect for the measurement of temperature by determining temperature from the measured magnetic permeability of the ordinary conductor. The thermometer embodying this idea, therefore, must use a large coil for the measurement of the magnetic permeability and, therefore, necessitates incorporation of a large housing for accommodating the coil. Besides, the measured temperature obtained by this thermometer is affected by device constants such as of the aforementioned coil and also by the repeating cycles of the change of temperature between normal room temperature and the temperature to be measured. Owing to these disadvantages, this thermometer has so far failed to find acceptance as a device for international comparison and standardization. Further, this thermometer can accurately measure temperature only over a very narrow temperature range and it has been difficult to provide accurate temperature measurement over a wide temperature range with one thermometer.

Under the circumstances a need has been felt for a small, light and easily portable secondary thermometer capable of providing highly accurate temperature measurement over a wide temperature range below 100 mK.

SUMMARY OF THE INVENTION

An object of this invention is to provide a small, light easily portable secondary thermometer which is capable of providing highly accurate and stable temperature measurement over a wide temperature range particularly below 100 mK, has excellent stability against thermal hysteresis, has excellent thermal response, and is sturdy enough to maintain constant device constants even when transported.

To accomplish the object described above according to this invention, there is provided a thermometer comprising a first superconductor serving as a core, a normal conductor wrapped around the periphery of the first superconductor, a second superconductor wrapped around the periphery of the normal conductor, two current sources, one for connected between the first and second superconductors and the other for connected between the opposite terminals of the first superconductor, and a voltmeter for connected between the first and second superconductors.

This thermometer utilizes the Josephson effect for measurement of temperature through direct observation of the change in magnetic permeability due to the temperature-dependent Meissner effect. When the voltmeter indicates a potential by allowing the electric current from the current source to flow between the first and second superconductors, the current strength is fixed at that level. Then, the electric current from the other current source is passed between the opposite terminals of the first superconductor, with the value of the electric current gradually varied. Consequently, the aforementioned potential between the first and second superconductors is changed in cycles which depend on the temperature under measurement. Desired detection of the temperature is obtained by measuring the electric current which is required for causing one cycle of change in the potential.

The other objects and characteristic features of the present invention will become apparent to those skilled in the art as the disclosure is made in the following description of preferred embodiments of the invention, as illustrated in the accompanying drawings.

DESCRIPTION OF THE PREFERRED EMBODIMENTS

Figure 1:
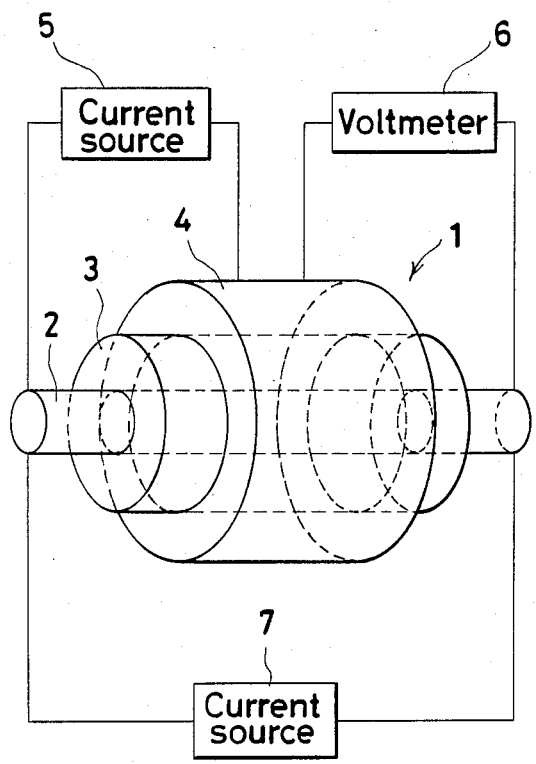
FIG. 1 is a schematic structural diagram of one embodiment of the thermometer according to the present invention.

This invention relates to a thermometer for measurement of cryogenic temperatures. In FIG. 1, 1 denotes a temperature detection unit which is formed by sequentially wrapping a normal conductor 3 and a second superconductor 4 concentrically around the periphery of a first cylindrical superconductor 2.

In the aforementioned temperature detection unit 1, a current source 5 is disposed between one end of the first superconductor 2 and the second superconductor 4, a voltmeter 6 is disposed between the other end of the first superconductor 2 and the second superconductor 4, and another current source 7 is disposed between the opposite ends of the first superconductor 2.

Figure 2:
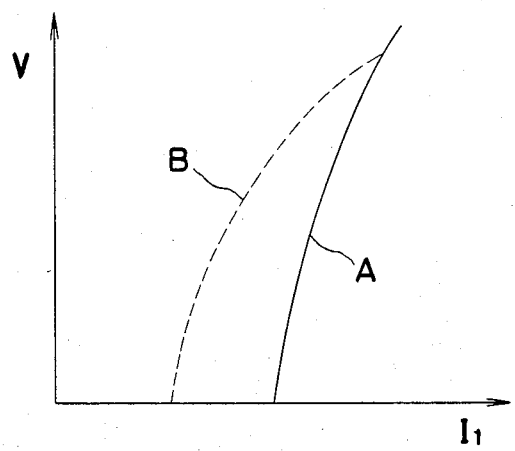
FIGS. 2 and 3 are current-voltage characteristic diagrams of the thermometer of FIG. 1.
Figure 3:
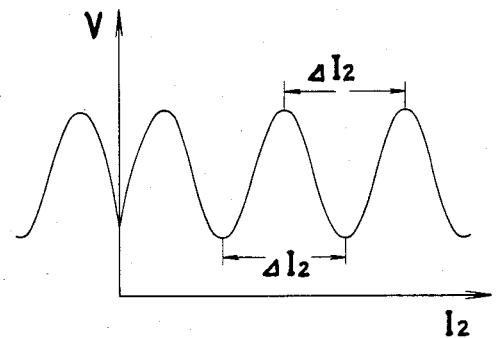

In the thermometer constructed as described above, when an electric current $I_1$ from the current source 5 is passed between the first and second superconductors 2 and 4, a potential (voltage V) is displayed on the voltmeter 6 by applying an electric current of a certain level. The characteristic curve A in the graph of FIG. 2 shows the relation between the electric current $I_1$ and the voltage V. When the normal conductor 3 in the aforementioned temperature detection unit 1 is given a sufficiently small thickness, the electric current $I_1$ is caused to flow in a pattern as illustrated in FIG. 2 by the Josephson effect. Then, an electric current $I_2$ from the current source 7 is passed in the axial direction through the first superconductor 2. Consequently, a magnetic field is formed around the first superconductor 2 and the relation between the electric current $I_1$ and the voltage V is changed to the pattern represented by the characteristic curve B. This change in relation occurs cyclically between the characteristic curves A and B when the aforementioned electric current $I_2$ is changed. The voltage V displayed by the voltmeter 6 is cyclically changed as illustrated in FIG. 3 when the electric current $I_2$ fed to the first superconductor 2 is changed while the electric current $I_1$ passed between the first and second superconductors 2 and 4 is fixed at a constant level. When the temperature dependence on an increment $\Delta I_2$ of the electric current $I_2$ corresponding to one cycle of change of the voltage V is measured, therefore, the temperature under measurement can be detected from the magnitude of this increment $\Delta I_2$.

A theoretical explanation of the change caused by temperature in the cycle of the aforementioned voltage V is as follows. The thickness of the normal conductor 3 which permits a magnetic field to be formed around the conductor 3 is decreased by the Meissner effect caused by the mutual access of the first and second superconductors 2 and 4 which are juxtaposed to the inner and outer surfaces of the normal conductor 3. The extent of this decrease in the thickness depends on temperature. To be specific, this extent of decrease expands in proportion as the temperature decreases, making the thickness of the normal conductor 3 responsible for the formation of the aforementioned magnetic field decrease proportionately. When the electric current is passed between the opposite terminals of the first superconductor 2, the magnetic field is formed in the portion of the normal conductor 3 encircling the first superconductor 2 which permits formation of the magnetic field. The increment $\Delta I_2$ of the electric current required for causing one quantum of change of the magnetic flux in that magnetic field depends on the thickness of the portion of the normal conductor 3 which permits formation of the magnetic field. Whenever the change occurs in each quantum of the aforementioned magnetic flux, the voltage which appears between the first and second superconductors 2 and 4 is changed by one cycle. Thus, the measurement of temperature can be effected on the basis of the increment $\Delta I_2$ of the electric current required for causing one cycle of change in voltage.

The increment $\Delta I_2$ of the electric current is obtained in the form of the magnitude of electric current for one cycle in the curve of voltage V in the diagram of FIG. 3. In this case, the sensitivity of the thermometer to temperature change can be enhanced by determining the temperature based on the increment of the electric current $I_2$ corresponding to a plurality of cycles of the voltage V.

The aforementioned thermometer has been designed on the basis of the principle described above. Owing to the construction of the temperature detection unit formed of the superconductors 2 and 4 and the normal conductor 3 as described above, the temperature range over which the thermometer provides effective temperature measurement has its lower limit. When the Meissner effect due to the access to the superconductors occurs throughout the entire normal conductor, the portion permitting formation of the magnetic field vanishes and the normal conductor is divested of sensitivity. By increasing the thickness of the normal conductor, the lower limit of the temperature range in which the thermometer provides effective temperature measurement can be lowered.

Figure 4:
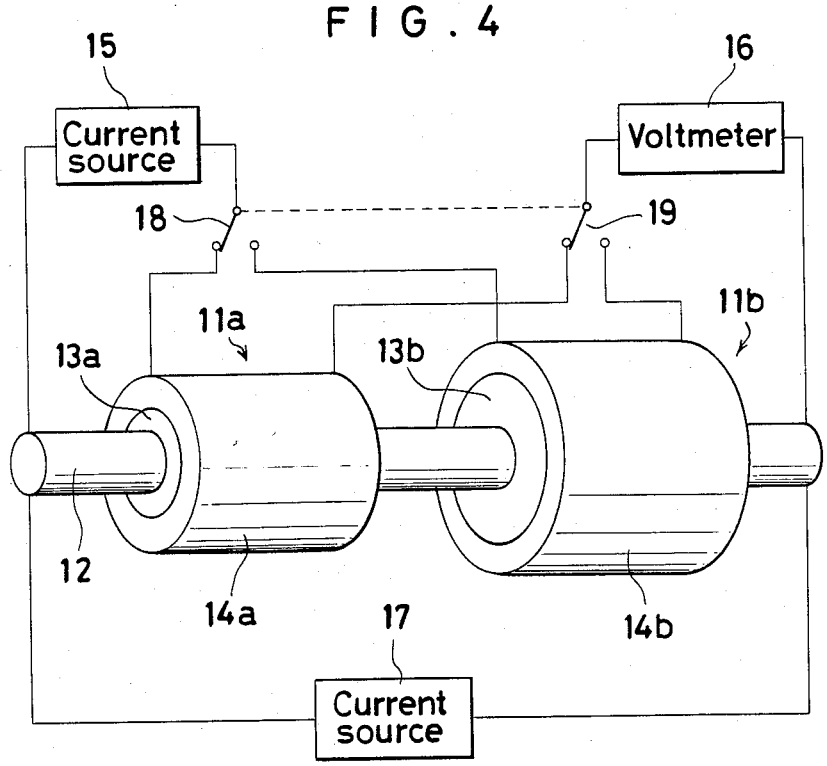
FIG. 4 is a cross section illustrating another embodiment of the thermometer of this invention.

FIG. 4 depicts an arrangement wherein first and second temperature detection units 11a and 11b having different ranges of temperature measurement are disposed in series for the purpose of expanding the range of temperature in which temperature measurement is effectively performed. Specifically, normal conductors 13a and 13b of different thicknesses are wrapped around a first superconductor 12 as separated axially from each other and second superconductors 14a and 14b are further wrapped around the normal conductors to complete the first and second temperature detection units 11a and 11b. A current source 15 is disposed between one terminal of the first superconductor 12 and the second superconductors 14a and 14b via a changeover switch 18. A voltmeter 16 is disposed between the other terminal of the first superconductor 12 and the second superconductors 14a and 14b via a changeover switch 19 synchronized with the aforementioned changeover switch 18. And another current source 17 is disposed to interconnect the opposite terminals of the first superconductor 12. To provide measurement of lower temperatures, therefore, this thermometer has only to be switched from the first temperature detection unit 11a to the second temperature detection unit 11b incorporating the normal conductor 13b of a greater thickness by means of the switches 18 and 19.

Figure 5:
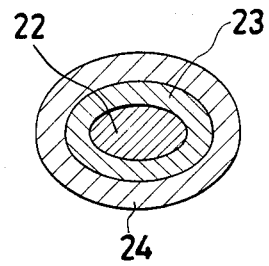
FIG. 5 is a schematic structural diagram of yet another embodiment of the thermometer of this invention.

The temperature detection unit in either of the foregoing embodiments is generally desired to have its component conductors concentrically arranged as viewed in its cross section. Optionally, it may have the component conductors superposed in non-circular shape, e.g. in elliptic shape as illustrated in FIG. 5. In this diagram, the symbols 22, 23 and 24 denote a first superconductor, a normal conductor, and a second superconductor respectively.

Figure 6:
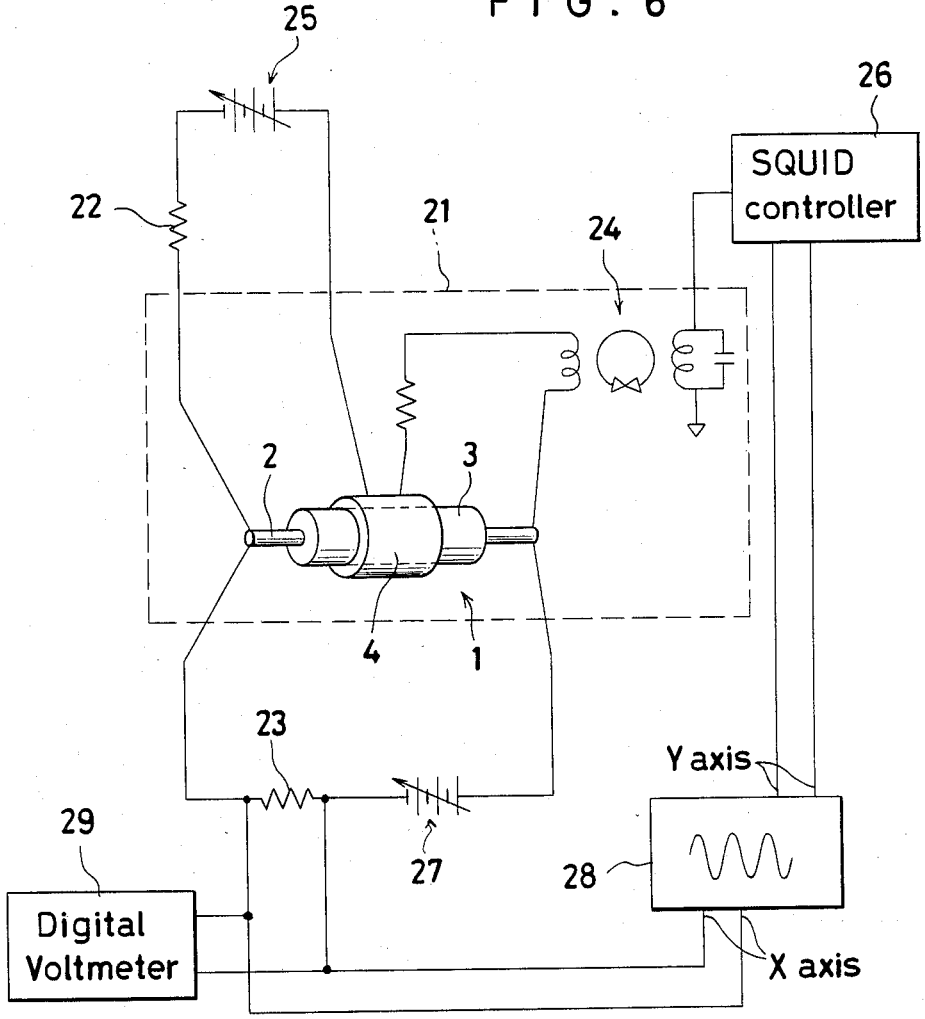
FIG. 6 is a schematic structural diagram illustrating a test model used for working this invention.

Now, a test model for working the present invention will be described below with reference to the schematic structural diagram of FIG. 6.

The temperature detection unit 1 used in this test model is obtained by suitably shaping a NbTi wire clad in copper (popularly known as "copper clad superconducting wire") which is rather easily available. The copper coat on the core of NbTi wire 70 $\mu$ in diameter is chemically corroded to a thickness of about 2 $\mu$. In the middle portion of the periphery of the copper coat (normal conductor 3) remaining on the periphery of the NbTi wire (first superconductor 2), PbSn solder is deposited in a length of about 2 mm in the axial direction so as to give rise to a second superconductor 4. The temperature detection unit (1) thus constructed is set in position on an article 21 subjected to temperature measurement and usually kept at a temperature below 4.2 K.

A power source (current source) 25 is disposed between one terminal of the first superconductor 2 and the second superconductor via a standard resistor 22. Through the medium of a superconducting quantum interference device (SQUID) 24 designed to enhance the sensitivity, a SQUID controller 26 is disposed between the other terminal of the first superconductor 2 and the second superconductor 4. Varied voltage is issued from the SQUID controller 26 as a measuring means or a has been inserted voltmeter. Another power source (current source) 27 is disposed between the opposite terminals of the first superconductor 2 via a standard resistor 23. The change in the electric current fed from the current source 27 to the standard resistor 23 is taken out of the opposite terminals of the resistor 23 and is forwarded to the X-Y recorder 28. At the same time, the change in the voltage between the first and second superconductors 2 and 4 which is consequently discharged from the SQUID controller 26 is forwarded to the X-Y recorder 28. As a result, the X-Y recorder 28 displays a waveform illustrating the electric current-voltage relation as shown in FIG. 3 for determining the measurement of temperature has been inserted before. By 29 is denoted a digital voltmeter for monitoring the change in electric current of the current source 27.

The foregoing description describes only one typical experiment conducted using one embodiment of this invention. Thus, the first superconductor, the normal conductor, and the second superconductor which make up the temperature detection unit 1 are not particularly defined with respect to their material and size.

As described above, the thermometer of the present invention is simply constructed as by interposing a normal conductor between first and second superconductors and, at the same time, suitably connecting thereto current sources and a voltmeter. Thus, it can be used conveniently without interference as from changing device constants, for example. Further since the temperature detection unit is wholly formed of the metal parts of the superconductors and the normal conductor, it enjoys high stability against thermal hysteresis. Since the space reserved for the formation of magnetic field is very small, the thermometer as a whole can be designed in a structure both compact and easy of transportation. Since the metallic parts of the component conductors in the temperature detection device can be formed in small sizes, the thermometer enjoys high thermal response and can be easily protected with a magnetic shield designed to preclude possible outside influences. The range of temperature measurement may also be expanded because of the special construction of the temperature detection device. The thermometer of this invention, accordingly, can meet a wide spectrum of requirements generally imposed on a secondary thermometer.

What is claimed is:

1. A thermometer comprising:

at least one temperature detection unit for setting in position on an object whose temperature is to be measured and comprising a first superconductor, at least one normal conductor wrapped around the periphery of said first superconductor, at least one second superconductor wrapped around the periphery of said normal conductor, a first power source connected to one end of said first superconductor and said second superconductor for passing electric current therebetween, a second power source connected to the opposite ends of said first superconductor for passing electric current therebetween, a voltmeter connected to the other end of said first superconductor and said second superconductor, measurement means coupled to said voltmeter for measuring a cryogenic temperature by fixing the value of the level of the electric current from said first power source and for changing the value of the electric current from said second power source, and determining means coupled to said measurement means for determining the temperature on the basis of the increment change in the electric current from said second power source which is required for causing at least one cycle of the change in the voltage indicated by said voltmeter.

2. A thermometer according to claim 1, which comprises one temperature detection unit having the first superconductor, the normal conductor, and the second superconductor disposed coaxially.

3. A thermometer according to claim 2, wherein said temperature detection unit has component conductors thereof superposed concentrically in a circular cross section.

4. A thermometer according to claim 2, wherein said temperature detection unit has component conductors thereof superposed in a eliptical cross section.

5. A thermometer according to claim 1, wherein a plurality of normal conductors of different thicknesses are wrapped around one first superconductor and as many second superconductors are wrapped around said normal conductors.

6. A thermometer according to claim 5, wherein changeover switches are disposed severally between the plurality of temperature detection units and said first power source connected to said first superconductors.

7. A thermometer according to claim 1, wherein said temperature detection unit has component conductors thereof superposed concentrically in a circular cross section.

8. A thermometer according to claim 1, wherein said temperature detection unit has component conductors thereof superposed in a eliptical cross section.

* * * * *